(12) United States Patent
Sinha

(10) Patent No.: US 11,032,396 B2
(45) Date of Patent: Jun. 8, 2021

(54) SYSTEMS AND METHODS FOR MANAGING CLIENT REQUESTS TO ACCESS SERVICES PROVIDED BY A DATA CENTER

(71) Applicant: Citrix Systems, Inc., Fort Lauderdale, FL (US)

(72) Inventor: Rajiv Sinha, Santa Clara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/415,761

(22) Filed: May 17, 2019

(65) Prior Publication Data

US 2020/0366759 A1 Nov. 19, 2020

(51) Int. Cl.
*H04L 29/08* (2006.01)
*H04L 12/26* (2006.01)

(52) U.S. Cl.
CPC .......... *H04L 67/36* (2013.01); *H04L 43/062* (2013.01); *H04L 43/0876* (2013.01); *H04L 43/16* (2013.01); *H04L 67/322* (2013.01); *H04L 67/327* (2013.01)

(58) Field of Classification Search
CPC ..... H04L 67/36; H04L 67/322; H04L 67/327; H04L 43/062; H04L 43/0876; H04L 43/16
See application file for complete search history.

(56) References Cited

U.S. PATENT DOCUMENTS 10,091,100 B1 * 10/2018 Duerk ................ H04L 47/24
10,334,029 B2 * 6/2019 Agrawal ............. H04L 67/1002
10,511,690 B1 * 12/2019 Chatterjee ............... H04L 67/02
2002/0172222 A1 * 11/2002 Ullmann ................ H04L 41/147 370/468
2012/0331524 A1 * 12/2012 Mower ................ H04L 67/125 726/3
2016/0127254 A1 * 5/2016 Kumar ................ H04L 41/0803 709/226
2016/0226736 A1 8/2016 Tran et al.
2016/0315808 A1 * 10/2016 Saavedra ............ H04L 12/2863

(Continued)

FOREIGN PATENT DOCUMENTS

WO WO-2018/200757 A1 11/2018

OTHER PUBLICATIONS

International Search Report and Written Opinion on International Appl. No. PCT/US2020/032580 dated Aug. 14, 2020.

*Primary Examiner* — Blake J Rubin
(74) *Attorney, Agent, or Firm* — Foley & Lardner LLP

(57) ABSTRACT

Described embodiments provide systems and methods for managing client requests to access services provided by a data center. A method can include identifying, by a first device, metrics of client requests to a service communicated from a plurality of clients via one or more Internet service providers (ISPs) to a data center including a plurality of servers providing the service. The method can include identifying metrics of application programming interface (API) requests communicated between a plurality of microservices of the service responsive to the client requests being forwarded to the plurality of servers. The method can include identifying metrics of responses to the client requests. The method can include displaying a service graph generated to identify, via the metrics, an issue with at least one of the one or more ISPs, the plurality of microservices, or one or more WAN links.

18 Claims, 11 Drawing Sheets

(56) References Cited

U.S. PATENT DOCUMENTS

| | | | |
|---|---|---|---|
| 2016/0337175 A1* | 11/2016 | Rao | H04L 41/12 |
| 2017/0068747 A1 | 3/2017 | Qi et al. | |
| 2017/0092060 A1* | 3/2017 | Toohey | G06Q 20/381 |
| 2017/0242784 A1* | 8/2017 | Heorhiadi | G06F 11/3692 |
| 2017/0250855 A1 | 8/2017 | Patil et al. | |
| 2017/0255884 A1* | 9/2017 | Visvanathan | G06Q 10/067 |
| 2017/0366623 A1* | 12/2017 | Shi | H04L 67/16 |
| 2018/0032534 A1* | 2/2018 | Koerner | G06F 16/2471 |
| 2018/0039565 A1* | 2/2018 | Rajagopalan | G06F 3/0482 |
| 2018/0077080 A1* | 3/2018 | Gazier | H04L 47/803 |
| 2018/0113940 A1* | 4/2018 | Mora Lopez | G06F 16/951 |
| 2018/0210929 A1* | 7/2018 | Mukherjee | G06F 16/248 |
| 2018/0248771 A1* | 8/2018 | Cote | H04L 41/5009 |
| 2018/0287876 A1* | 10/2018 | Strobel | H04L 41/12 |
| 2018/0287877 A1* | 10/2018 | Navare | H04L 67/1008 |
| 2018/0288129 A1* | 10/2018 | Joshi | H04L 41/5096 |
| 2018/0302283 A1* | 10/2018 | Vyas | G06F 9/45558 |
| 2018/0309637 A1* | 10/2018 | Gill | H04L 41/145 |
| 2019/0052549 A1* | 2/2019 | Duggal | G06Q 30/04 |
| 2019/0058761 A1* | 2/2019 | Hassan | H04L 67/02 |
| 2019/0082353 A1* | 3/2019 | Nguyen | H04L 67/1044 |
| 2019/0104184 A1* | 4/2019 | Gao | H04L 67/16 |
| 2019/0124504 A1* | 4/2019 | Tran | H04L 65/1073 |
| 2019/0199626 A1* | 6/2019 | Thubert | H04L 45/64 |
| 2019/0215248 A1* | 7/2019 | D'Ippolito | H04L 41/5051 |
| 2019/0238450 A1* | 8/2019 | Michael | H04L 43/0864 |
| 2019/0273746 A1* | 9/2019 | Coffing | H04L 63/105 |
| 2019/0354352 A1* | 11/2019 | Natarajan | G06F 9/44526 |
| 2019/0356555 A1* | 11/2019 | Bai | H04L 41/145 |
| 2019/0363934 A1* | 11/2019 | Li | H04L 41/04 |
| 2020/0007647 A1* | 1/2020 | Castagna | G06Q 20/384 |
| 2020/0026565 A1* | 1/2020 | Rajendran | G06F 9/45558 |
| 2020/0050494 A1* | 2/2020 | Bartfai-Walcott | G06F 9/5083 |
| 2020/0067800 A1* | 2/2020 | Wang | H04L 41/5051 |
| 2020/0133738 A1* | 4/2020 | Junior | H04L 47/826 |
| 2020/0151733 A1* | 5/2020 | Sidhu | G06Q 30/016 |
| 2020/0159557 A1* | 5/2020 | Pasupathy | G06F 8/60 |
| 2020/0162325 A1* | 5/2020 | Desai | H04L 41/0893 |
| 2020/0162353 A1* | 5/2020 | Szigeti | H04L 41/5009 |
| 2020/0162578 A1* | 5/2020 | Appajanna | H04L 67/32 |
| 2020/0162917 A1* | 5/2020 | Anantha | H04L 63/0807 |
| 2020/0204452 A1* | 6/2020 | Bhat | H04L 41/0645 |
| 2020/0259715 A1* | 8/2020 | Schermann | H04L 41/12 |

* cited by examiner

SYSTEMS AND METHODS FOR MANAGING CLIENT REQUESTS TO ACCESS SERVICES PROVIDED BY A DATA CENTER

FIELD OF THE DISCLOSURE

The present application generally relates to monitoring and controlling traffic in a computer network, including but not limited to systems and methods for managing client requests to access services provided by a data center.

BACKGROUND

Requests may be sent by a requestor destined to one or more services executing in one or more data centers. The requests and subsequent responses to the requests may traverse a complex computer network, such as the Internet. Delay may be introduced by aspects of the computer network or by problems with the services executing in the one or more data centers. This can cause interruption in servicing the requests and can impact the performance or operation of the service or application.

SUMMARY

This Summary is provided to introduce a selection of concepts in a simplified form that are further described below in the Detailed Description. This Summary is not intended to identify key features or essential features, nor is it intended to limit the scope of the claims included herewith.

Computer applications can be provided to a client computing device by a remote server. For example, a data center can include one or more servers, each of which may host one or more services that together can form a software applications. Each service can include one or more microservices, which may include software components such as scripts or other executable code configured to perform at least a portion of the functionality associated with their respective services. A client computing device can access a remotely hosted software application by making a series of requests to the remote servers that provide the application. The servers can use the services and microservices of the application to generate responses to the requests of the client computing device, and can transmit the responses to the client computing device.

In some embodiments, requests and responses may be transmitted between the client computing device and the remote servers via a complex computer network, such as the Internet. For example, the requests and responses may pass through computing devices such as gateways, routers, switches, etc., which may be associated with internet service providers, geographically dispersed data centers, and other entities. Due to the complex topology of such a network, it can be technically challenging to determine the cause or location of issues such as problems with delay, latency, bandwidth, response time, application errors, or other problems that can degrade the performance of a remotely provided application. As a result, it can also be technically challenging to overcome such issues, for example by selecting an alternate route through the network or an alternate destination (e.g., a different data center providing the same or similar application) in a manner that can mitigate such issues.

This disclosure provides techniques for identifying the cause and location of such issues. For example, one or more computing devices can identify or determine metrics relating to network traffic (e.g., requests and responses) traversing various portions of a complex computer networking topology. In some embodiments, metrics can be identified for portions of the topology relating to internet service providers, data centers, services and microservices, and links such as wide area network (WAN) links or software-defined WAN (SD-WAN) links. Based on these metrics, problematic areas, devices, or network links can be identified. In some embodiments, alternate network paths or destinations can be selected to avoid areas, devices, or network links that have been identified as potentially problematic. In some embodiments, a visual representation of the network topology and the metrics can be generated and displayed, for example in the form of a service graph, in order to help identify issues that may degrade network performance.

An aspect of this disclosure provides a method for managing client requests to access services provided by a data center. The method can include identifying, by a first device, first metrics of client requests to a service communicated from a plurality of clients via one or more Internet service providers (ISPs) to a data center including a plurality of servers providing the service. The method can include identifying, by the first device, second metrics of application programming interface (API) requests communicated between a plurality of microservices of the service responsive to the client requests being forwarded to the plurality of servers. The method can include identifying, by the first device, third metrics of responses to the client requests. The responses to the client requests can be generated by the plurality of microservices and can be communicated between a second device and the plurality of clients via one or more wide area network (WAN) links. The method can include displaying, by the first device, a service graph generated to identify via the first metrics, the second metrics, or the third metrics, an issue with at least one of the one or more ISPs, the plurality of microservices, or the one or more WAN links.

In some embodiments, a client request of the plurality of client requests can be forwarded to the data center by a traffic manager configured to select one of a global traffic manager or the data center based on at least fourth metrics of the one or more ISPs.

In some embodiments, the first device can be intermediary to the one or more ISPs and the data center. In some embodiments, the second device can be intermediary between the plurality of servers and the plurality of clients and can be configured to select a WAN link from the one or more WAN links over which to communicate a response to a client request.

In some embodiments, the method can further include generating, by the first device, the service graph including a plurality of nodes to represent at least each of the one or more ISPs, the second device, and the plurality of microservices of the service. In some embodiments, the method the include generating, by the first device, the service graph to include arcs between each of the plurality of nodes to identify metrics of network traffic between each of the plurality of nodes.

In some embodiments, the plurality of client requests can be forwarded from the plurality of clients via the one or more ISPs to an application delivery controller configured to manage network traffic to the service. In some embodiments, the method can further include identifying, by the first device, from the application delivery controller, metrics of network traffic of the plurality of clients between the one or more ISPs and the service. In some embodiments, the method can further include generating, by the first device, the service graph, to identify via the metrics of network traffic, one or more issues between the one or more ISPs and the service.

In some embodiments, the method can further include displaying, by the first device, the service graph generated to identify metrics of network traffic from the plurality of clients via the one or more ISPs through the data center and to the plurality of clients via the second device. In some embodiments, the method can include identifying, by the first device, the issue via the service graph.

Another aspect of this disclosure provides a system for managing client requests to access services provided by a data center. The system can include a first device including one or more processors and coupled to memory. The first device can be configured to identify first metrics of a request communicated between a client of a plurality of clients via an Internet service provider (ISP) to a data center including a plurality of servers proving a service. The request can be a request to access the service. The first device can be configured to identify second metrics of application programming interface (API) requests communicated between a plurality of microservices of the service responsive to the client requests being forwarded to the plurality of servers. The first device can be configured to identify third metrics of responses to the client requests. The responses can be generated by the plurality of services and can be communicated between a second device and the client via one or more wide area network (WAN) links. The first device can be configured to display a service graph generated to identify via the first metrics, the second metrics, or the third metrics an issue with at least one of the one or more ISPs, the plurality of microservices, or the one or more WAN links.

In some embodiments, the request from the client can be forwarded to the data center by a traffic manager configured to select one of a global traffic manager or the data center based on a least fourth metrics of the one or more ISPs. In some embodiments, the first device can be intermediary to the one or more ISPs and the data center. In some embodiments, the second device can be intermediary between the plurality of servers and the plurality of clients and can be configured to select a WAN link of the one or more WAN links over which to communicate a response to a client request.

In some embodiments, the first device can be further configured to generate the service graph including a plurality of nodes to represent at least each of the one or more ISPs, the second device, and the plurality of microservices of the service. In some embodiments, the first device can be further configured to generate the service graph to include arcs between each of the plurality of nodes to identify metrics on network traffic between each of the plurality of nodes.

In some embodiments, the client requests can be forwarded from the plurality of clients via the one or more ISPs to an application delivery controller configured to manage network traffic to the service. In some embodiments, the first device can be further configured to identify from the application delivery controller metrics of network traffic of the plurality of clients between the one or more ISPs and the service and to generate the service graph to identify via the metrics one or more issues between the one or more ISPs and the service.

In some embodiments, the first device can be further configured to display the service graph generated to identify metrics of network traffic from the plurality of clients via the one or more ISPs through the data center and to the plurality of clients via the second device. In some embodiments, the first device can be further configured to identify the issue via the service graph.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment;

Section E describes embodiments of systems and methods for a service graph based platform and technology; and Section F describes embodiments of systems and methods for managing client requests to access services provided by a data center.

A. Network and Computing Environment

Figure 1A:
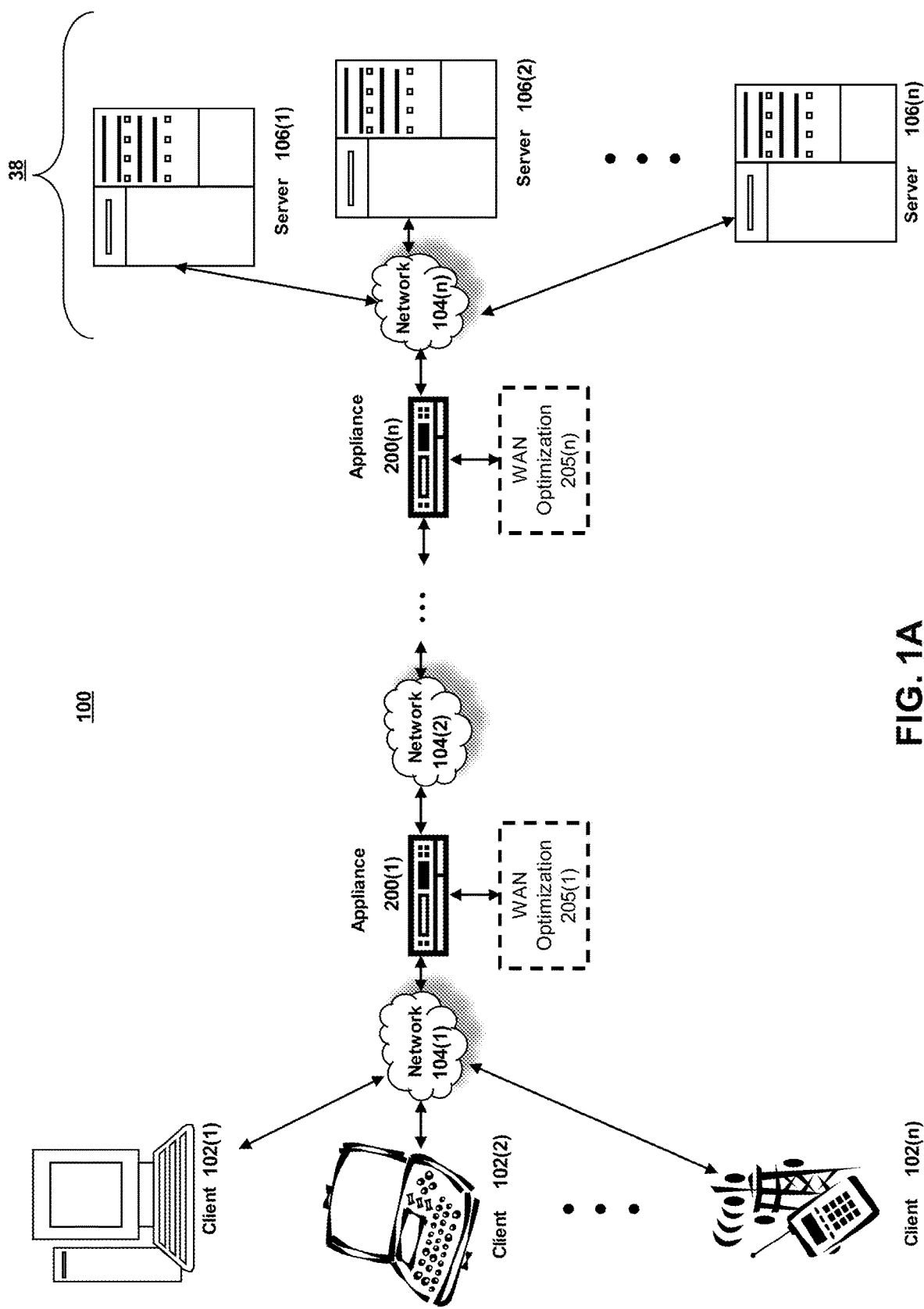
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
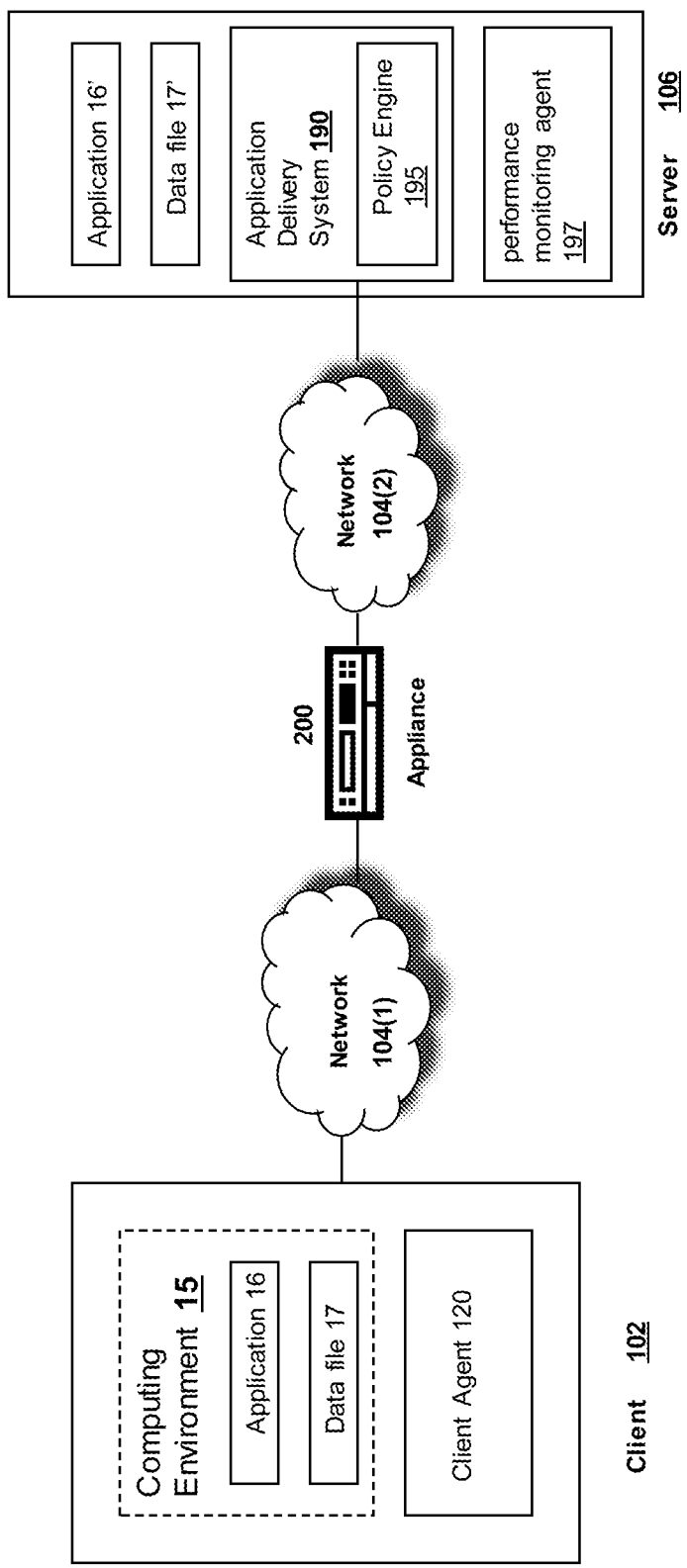
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
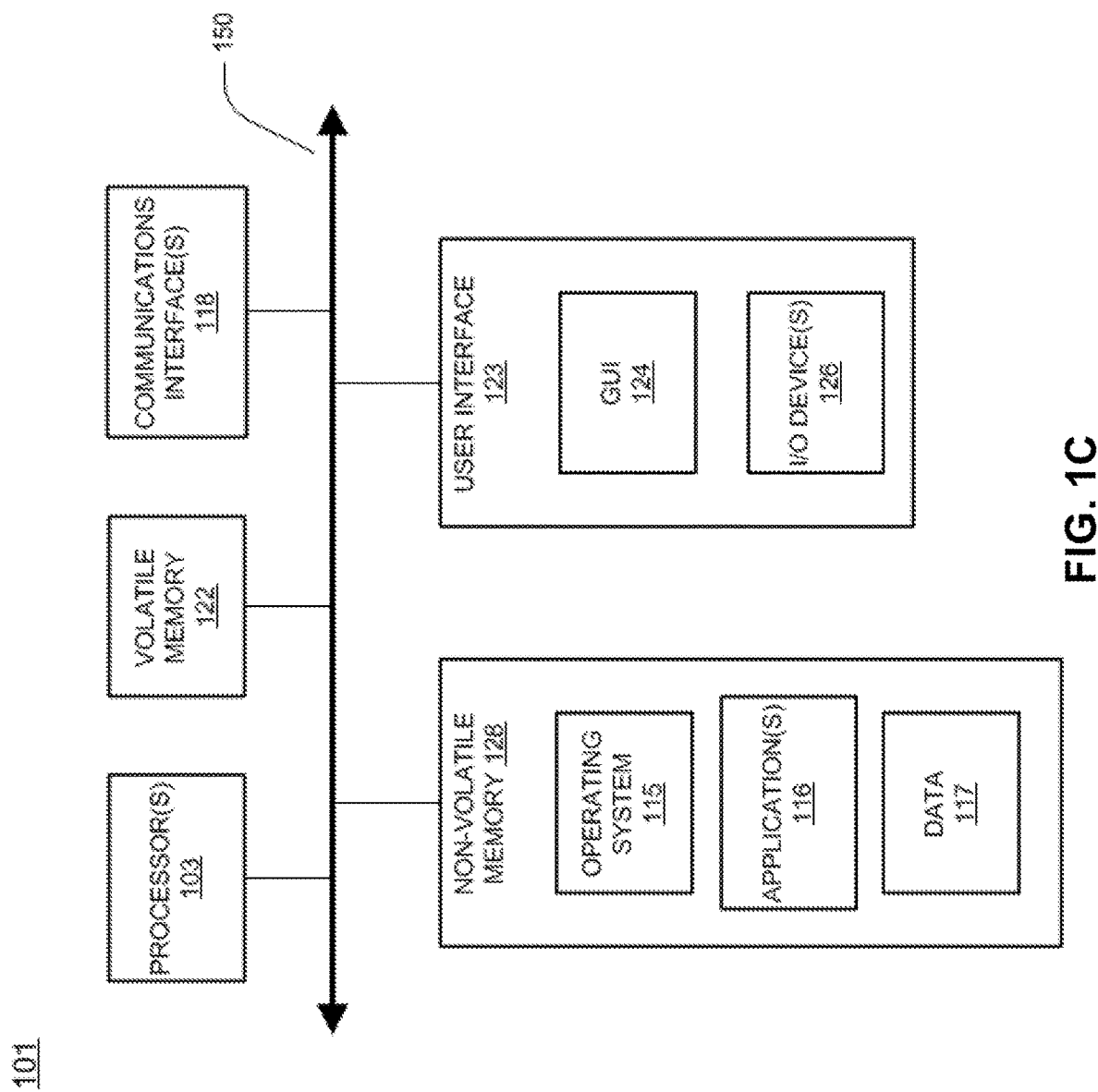
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
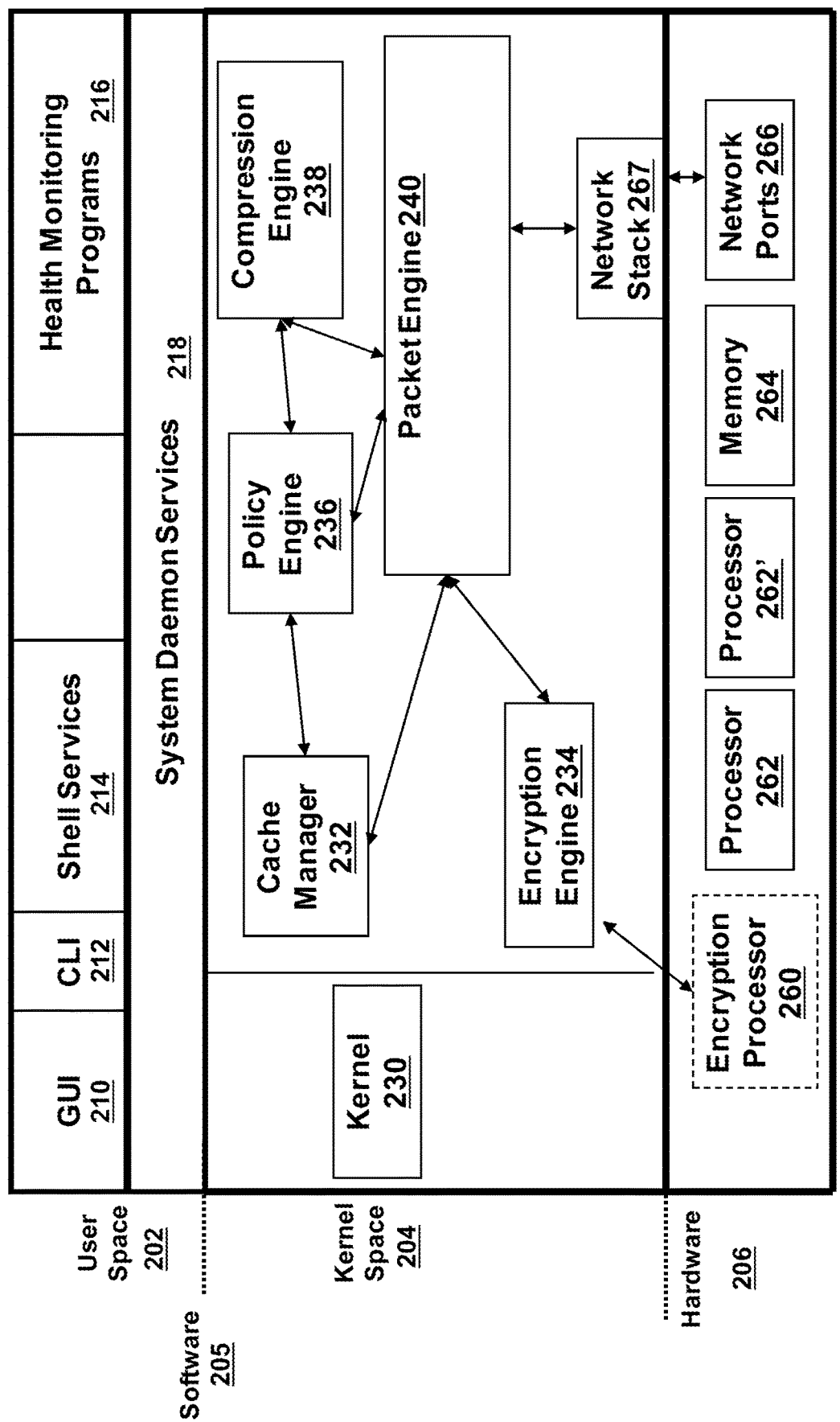
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, Fla. In an illustrative embodiment, device 302 executing a hypervisor that creates a virtual machine platform on which guest operating systems may execute is referred to as a host server. 302

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
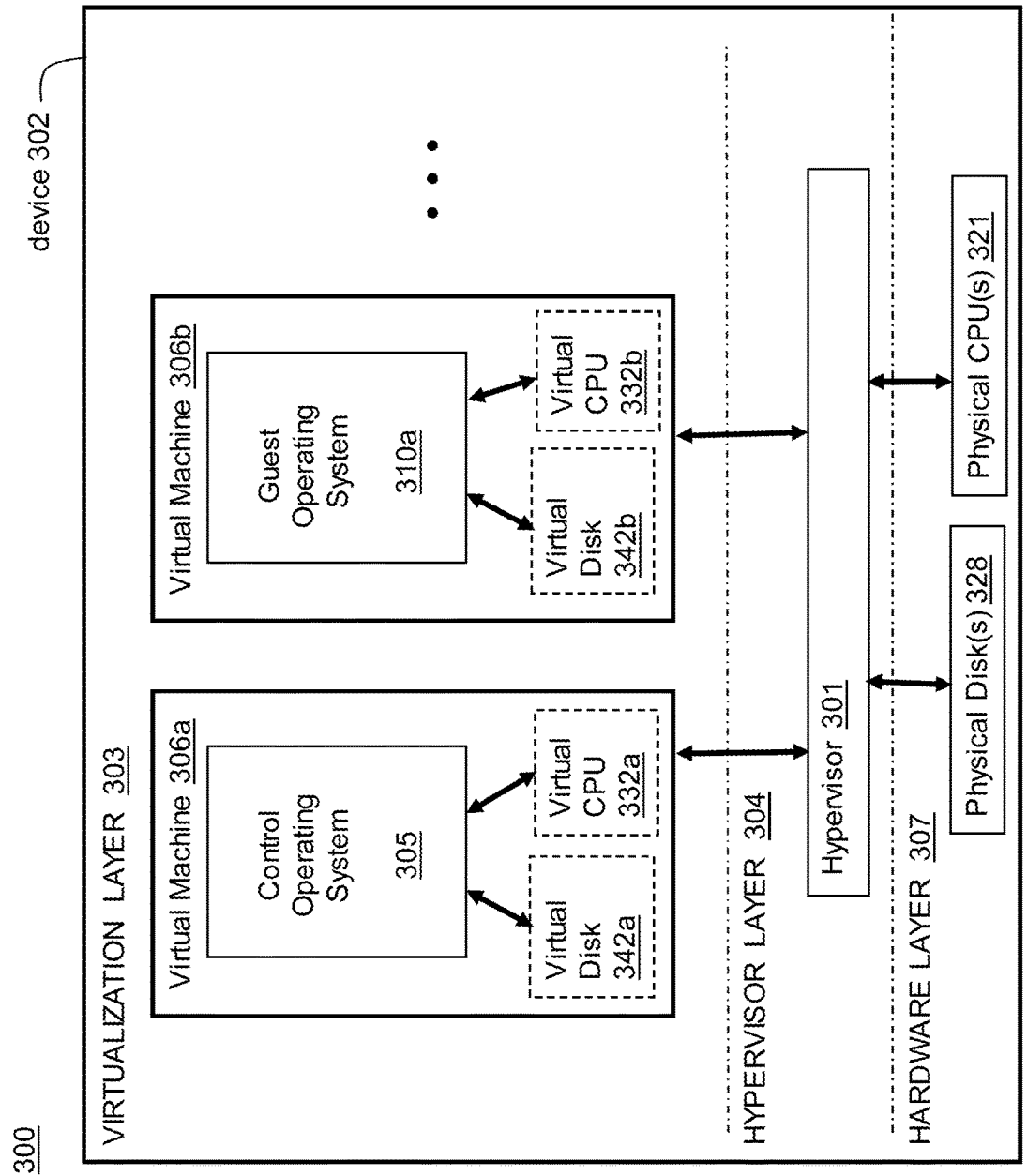
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

D. Systems and Methods for Providing a Distributed Cluster Architecture

Figure 4:
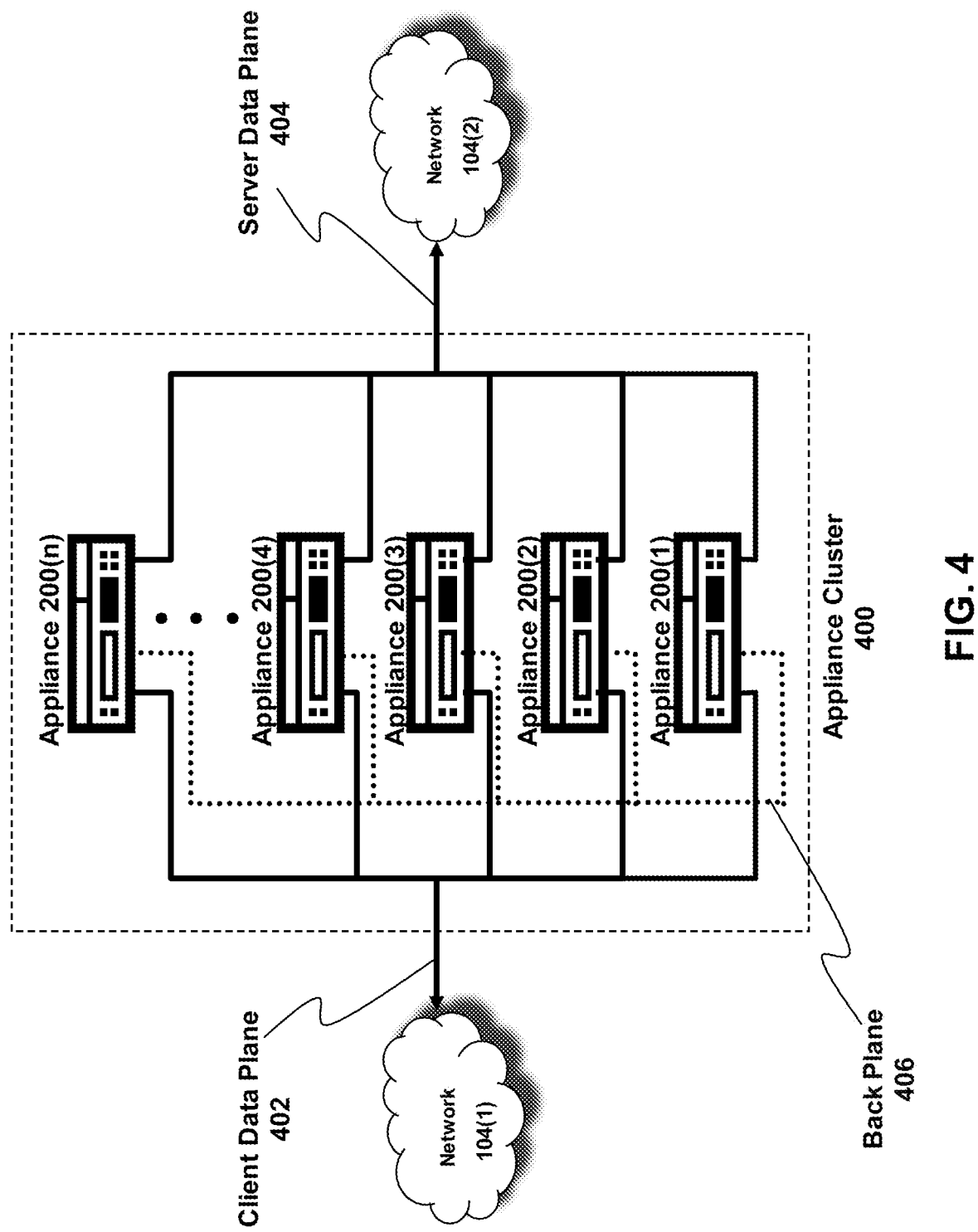
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

E. Service Graph Based Platform and Technology

Figure 5A:
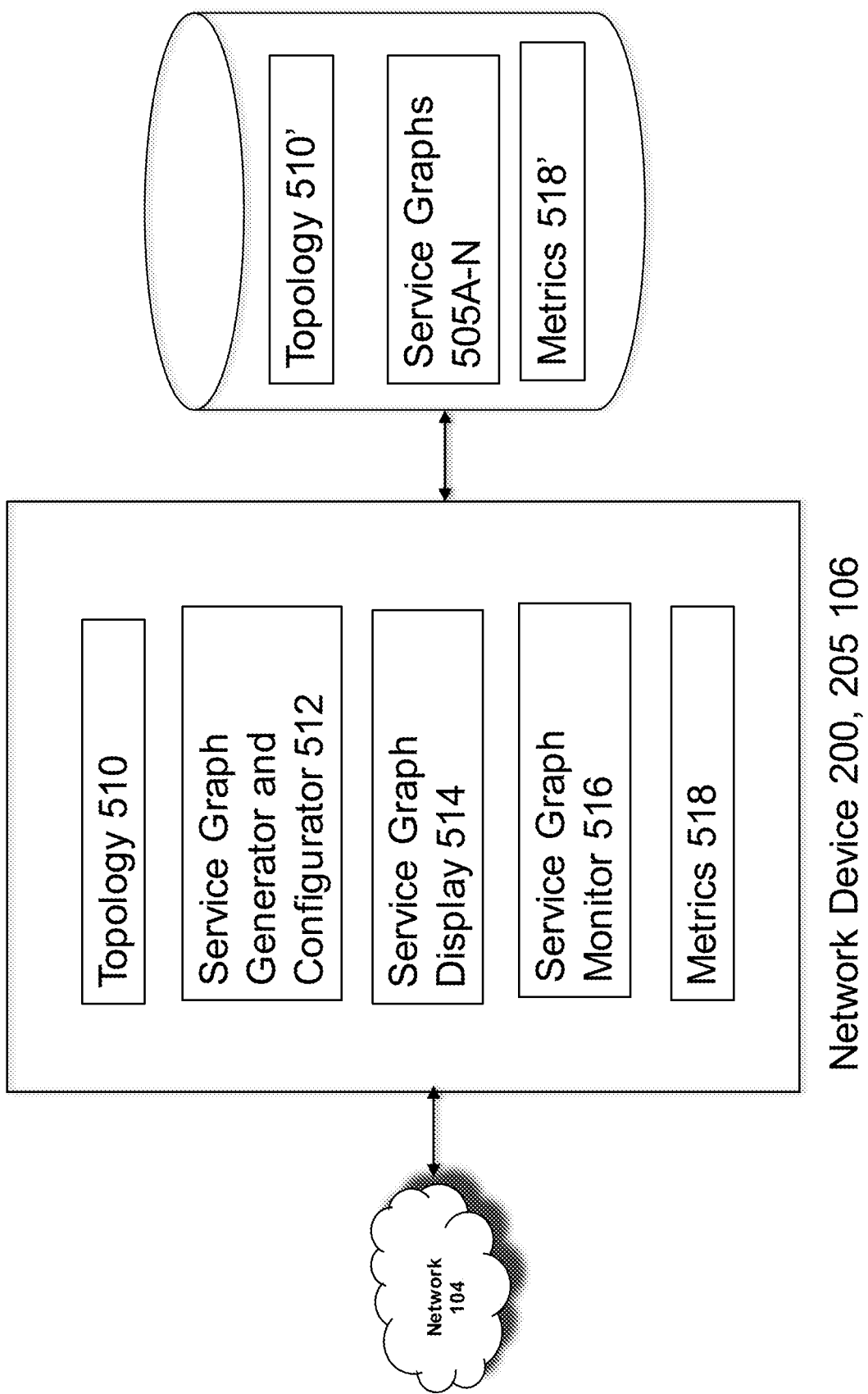
FIG. 5A is a block diagram of a service graph based system, in accordance with an illustrative embodiment.
Figure 5B:
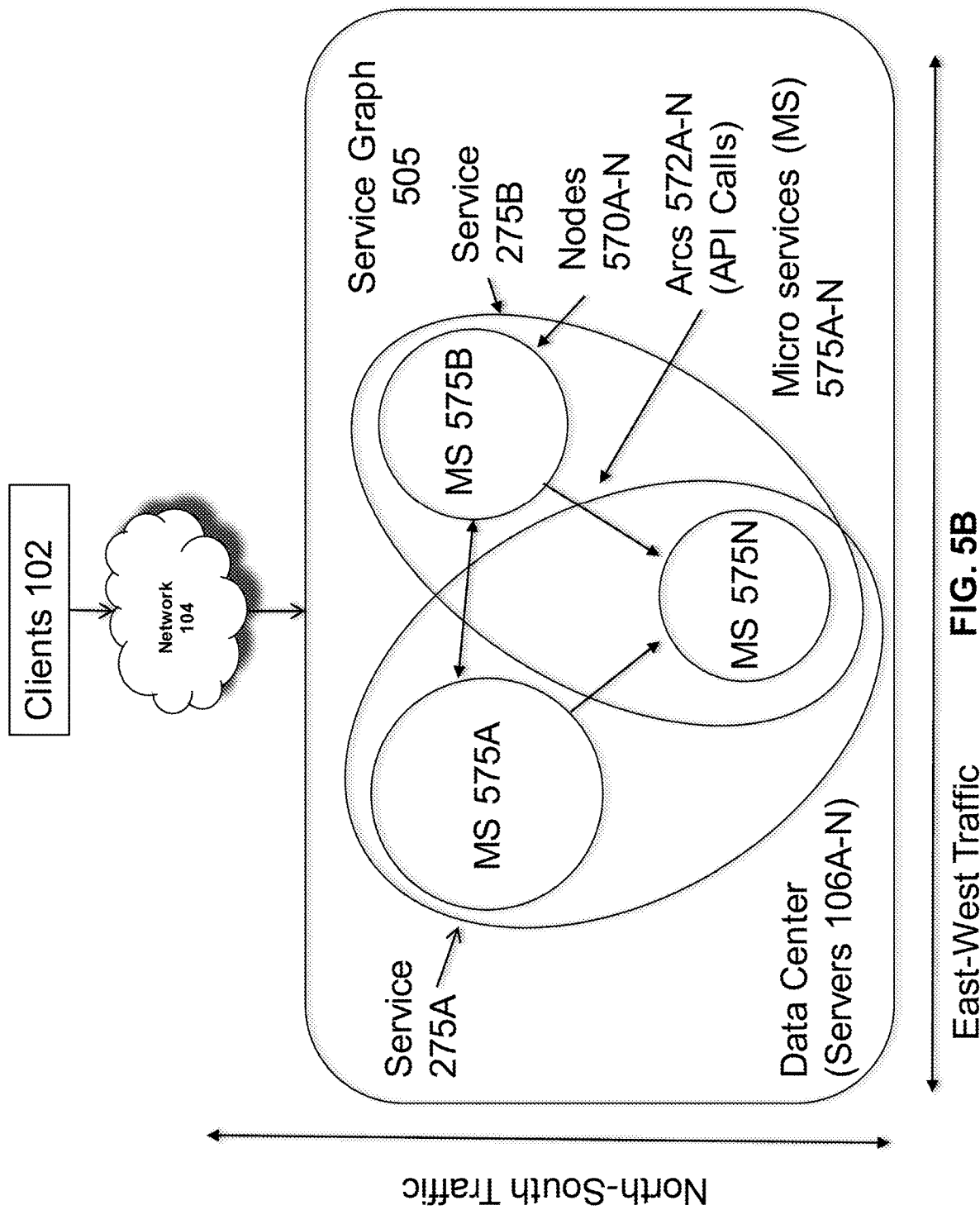
FIG. 5B is a block diagram of a service graph, in accordance with an illustrative embodiment.
Figure 5C:
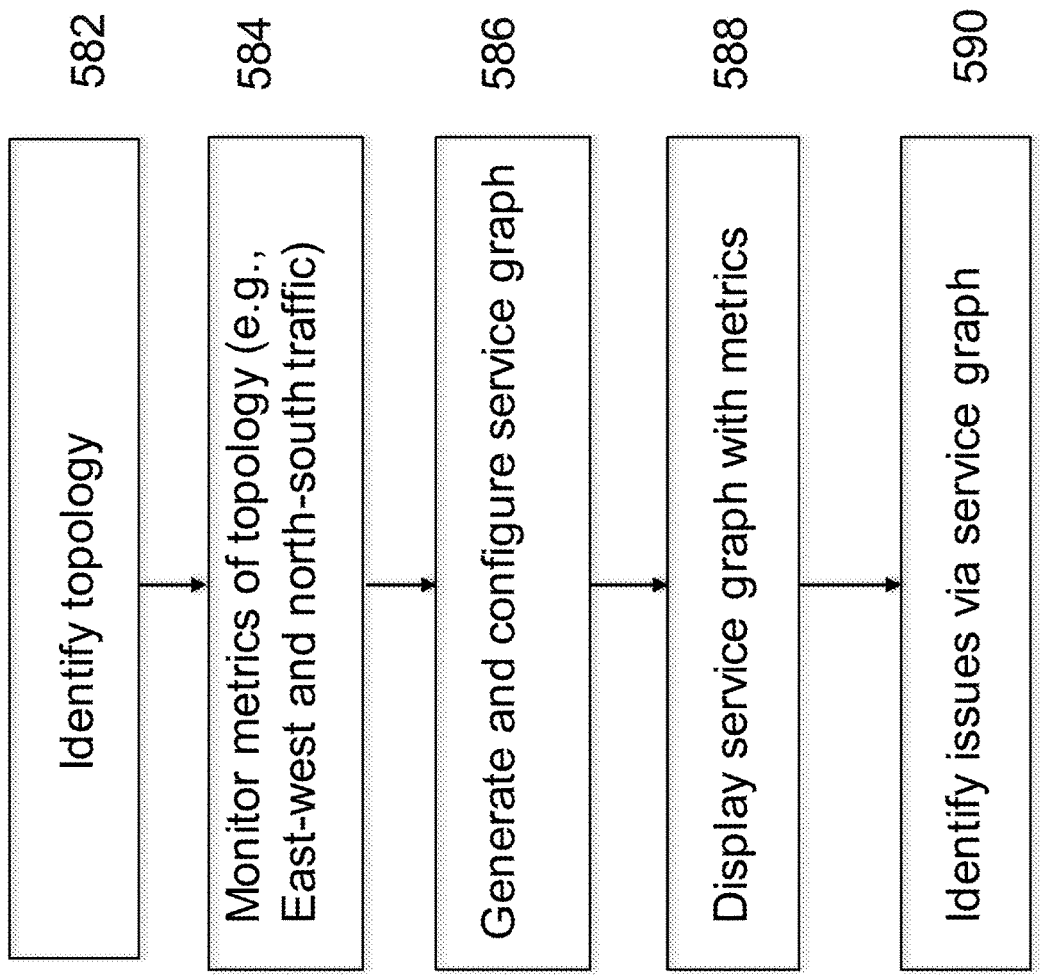
FIG. 5C is a flow diagram of a method of using a service graph, in accordance with an illustrative embodiment.

Referring now to FIGS. 5A-5C, implementation of systems and methods for a service graph based platform and technology will be discussed. A service graph is a useful technology tool for visualizing a service by its topology of components and network elements. Services may be made up of microservices with each microservice handling a particular set of one or more functions of the service. Network traffic may traverse the service topology such as a client communicating with a server to access service (e.g., north-south traffic). Network traffic of a service may include network traffic communicated between microservices of the services such as within a data center or between data centers (e.g., east-west traffic). The service graph may be used to identify and provide metrics of such network traffic of the service as well as operation and performance of any network elements used to provide the service. Service graphs may be used for identifying and determining issues with the service and which part of the topology causing the issue. Services graphs may be used to provide for administering, managing and configuring of services to improve operational performance of such services.

Referring to FIG. 5A, an implementation of a system for service graphs, such as those illustrated in FIG. 5B, will be described. A device on a network, such as a network device 200, 205 or a server 206, may include a service graph generator and configurator 512, a service graph display 514 and service graph monitor 516. The service graph generator and configurator 512 (generally referred to as service graph generator 512), may identify a topology 510 of elements in the network and metrics 518 related to the network and the elements, to generate and/or configure service graphs 505A-N. The service graphs 505A-N (generally referred to as service graphs 505) may be stored in one or more databases, with any of the metric 518' and/or topology 510'. The service graphic generator 512 may generate data of the service graphs 505 to be displayed in a display or rendered form such as via a user interface, generated referred to as service graph display 514. Service graph monitor 516 may monitor the network elements of the topology and service for metrics 518 to configure and generate a service graph 505 and/or to update dynamically or in real-time the elements and metrics 518 of or represented by a service graph display 514.

The topology 510 may include data identifying, describing, specifying or otherwise representing any elements used, traversed in accessing any one or more services or otherwise included with or part of such one or more services, such as any of the services 275 described herein. The topology may include data identifying or describing any one or more networks and network elements traversed to access or use the services, including any network devices, routers, switches, gateways, proxies, appliances, network connections or links, Internet Service Providers (ISPs), etc. The topology may include data identifying or describing any one or more applications, software, programs, services, processes, tasks or functions that are used or traversed in accessing a service. In some implementations, a service may be made up or include multiple microservices, each providing one or more functions, functionality or operations of or for a service. The topology may include data identifying or describing any one or more components of a service, such as programs, functions, applications or microservices used to provide the service. The topology may include parameters, configuration data and/or metadata about any portion of the topology, such as any element of the topology.

A service graph 505 may include data representing the topology of a service 275, such any elements making up such a service or used by the service, for example as illustrated in FIG. 5B. The service graph may be in a node base form, such as graphical form of nodes and each node representing an element or function of the topology of the service. A service graph may represent the topology of a service using nodes connected among each other via various connectors or links, which may be referred to as arcs. The arc may identify a relationship between elements connected by the arc. Nodes and arcs may be arranged in a manner to identify or describe one or more services. Nodes and arcs may be arranged in a manner to identify or describe functions provided by the one or more services. For example, a function node may represent a function that is applied to the traffic, such as a transform (SSL termination, VPN gateway), filter (firewalls), or terminal (intrusion detection systems). A function within the service graph might use one or more parameters and have one or more connectors.

The service graph may include any combination of nodes and arcs to represent a service, topology or portions thereof. Nodes and arcs may be arranged in a manner to identify or describe the physical and/or logical deployment of the service and any elements used to access the service. Nodes and arcs may be arranged in a manner to identify or describe the flow of network traffic in accessing or using a service. Nodes and arcs may be arranged in a manner to identify or describe the components of a service, such as multiple microservices that communicate with each other to provide functionality of the service. The service graph may be stored in storage such as a database in a manner in order for the service graph generator to generate a service graph in memory and/or render the service graph in display form 514.

The service graph generator 512 may include an application, program, library, script, service, process, task or any type and form of executable instructions for establishing, creating, generating, implementing, configuring or updating a service graph 505. The service graph generator may read and/or write data representing the service graph to a database, file or other type of storage. The service graph generator may comprise logic, functions and operations to construct the arrangement of nodes and arcs to have an electronic representation of the service graph in memory. The service graph generator may read or access the data in the database and store data into data structures and memory elements to provide or implement a node based representation of the service graph that can be updated or modified. The service graph generator may use any information from the topology to generate a service graph. The service graph generator may make network calls or use discovery protocols to identify the topology or any portions thereof. The service graph generator may use any metrics, such as in memory or storage or from other devices, to generate a service graph. The service graph generator may comprise logic, functions and operations to construct the arrangement of nodes and arcs to provide a graphical or visual representation of the service graph, such as on a user interface of a display device. The service graph generator may comprise logic, functions and operations to configure any node or arc of the service graph to represent a configuration or parameter of the corresponding or underlying element represented by the node or arc. The service graph generator may comprise logic, functions and operations to include, identify or provide metrics in connection with or as part of the arrangement of nodes and arcs of the service graph display. The service graph generator may comprise an application programming interface (API) for programs, applications, services, tasks, processes or systems to create, modify or interact with a service graph.

The service graph display 514 may include any graphical or electronic representation of a service graph 505 for rendering or display on any type and form of display device. The service graph display may be rendered in visual form to have any type of color, shape, size or other graphical indicators of the nodes and arcs of the service graph to represent a state or status of the respective elements. The service graph display may be rendered in visual form to have any type of color, shape, size or other graphical indicators of the nodes and arcs of the service graph to represent a state or status of one or more metrics. The service graph display may comprise any type of user interface, such as a dashboard, that provides the visual form of the service graph. The service graph display may include any type and form of user interface elements to allow users to interact, interface or manipulate a service graph. Portion of the service graph display may be selectable to identify information, such as metrics or topology information about that portion of the service graph. Portions of the service graph display may provide user interface elements for users to take an action with respect to the service graph or portion thereof, such as to modify a configuration or parameter of the element.

The service graph monitor 518 may include an application, program, library, script, service, process, task or any type and form of executable instructions to receive, identify, process metrics 518 of the topology 510. The service graph monitor 518 monitors via metrics 518 the configuration, performance and operation of elements of a service graph. The service graph monitor may obtain metrics from one or more devices on the network. The service graph monitor may identify or generate metrics from network traffic traversing the device(s) of the service graph monitor. The service graph monitor may receive reports of metrics from any of the elements of the topology, such as any elements represented by a node in the service graph. The service graph monitor may receive reports of metrics from the service. From the metrics, the service graph monitor may determine the state, status or condition of an element represented in or by the service graph, such as by a node of the service graph. From the metrics, the service graph monitor may determine the state, status or condition of network traffic or network connected represented in or by the service graph, such as by an arc of the service graph. The service graph generator and/or service graph monitor may update the service graph display, such as continuously or in predetermined frequencies or event based, with any metrics or any changed in the state, status or condition of a node or arc, element represented by the node or arc, the service, network or network traffic traversing the topology.

The metrics 518, 518' (generally referred to as metrics 518) may be stored on network device in FIG. 5B, such as in memory or storage. The metrics 518, 518' may be stored in a database on the same device or over a network to another device, such as a server. Metrics may include any type and form of measurement of any element of the topology, service or network. Metrics may include metrics on volume, rate or timing of requests or responses received, transmitted or traversing the network element represented by the node or arc. A Metrics may include metrics on usage of a resource by the element represented by the node or arc, such as memory, bandwidth. Metrics may include metrics on performance and operation of a service, including any components or microservices of the service, such as rate of response, transaction responses and times.

FIG. 5B illustrates an implementation of a service graph in connection with microservices of a service in view of east-west network traffic and north-south network traffic. In brief overview, clients 102 may access via one or more networks 104 a data center having servers 106A-106N (generally referred to as servers 106) providing one or more services 275A-275N (generally referred to as services 275). The services may be made up multiple microservices 575A-575N (generally referred to as microservice or micro service 575). Service 275A may include microservice 575A and 575N while service 275B may include microservice 575B and 575N. The microservices may communicate among the microservices via application programming interface (APIs). A service graph 505 may represent a topology of the services and metrics on network traffic, such as east-west network traffic and north-south network traffic.

North-south network traffic generally describes and is related to network traffic between clients and servers, such as client via networks 104 to servers of data center and/or servers to clients via network 104 as shown in FIG. 5B. East-west network traffic generally describes and is related to network traffic between elements in the data centers, such as data center to data center, server to server, service to service or microservice to microservice.

A service 275 may comprise microservices 575. In some aspects, microservices is a form of service-oriented architecture style wherein applications are built as a collection of different smaller services rather than one whole or singular application (referred to sometimes as a monolithic application). Instead of a monolithic application, a service has several independent applications or services (e.g., microservices) that can run on their own and may be created using different coding or programming languages. As such, a larger server can be made up of simpler and independent programs or services that are executable by themselves. These smaller programs or services are grouped together to deliver the functionalities of the larger service. In some aspects, a microservices based service structures an application as a collection of services that may be loosely coupled. The benefit of decomposing a service into different smaller services is that it improves modularity. This makes the application or service easier to understand, develop, test, and be resilient to changes in architecture or deployment.

A microservice includes an implementation of one or more functions or functionality. A microservice may be a self-contained piece of business function(s) with clear or established interfaces, such as an application programming interface (API). In some implementations, a microservice may be deployed in a virtual machine or a container. A service may use one or more functions on one microservice and another one or more functions of a different microservice. In operating or executing a service, one microservice may make API calls to another microservice and the microservice may provide a response via an API call, event handler or other interface mechanism. In operating or executing a microservice, the microservice may make an API call to another microservice, which in its operation or execution, makes a call to another microservice, and so on.

The service graph 505 may include multiple nodes 570A-N connected or linked via one or more or arcs 572A-572N. The service graph may have different types of nodes. A node type may be used to represent a physical network element, such as a server, client, appliance or network device. A node type may be used to represent an end point, such as a client or server. A node type may be used to represent an end point group, such as group of clients or servers. A node type may be used to represent a logical network element, such as a type of technology, software or service or a grouping or sub-grouping of elements. A node type may be used to represent a functional element, such as functionality to be provided by an element of the topology or by the service.

The configuration and/or representation of any of the nodes 570 may identify a state, a status and/or metric(s) of the element represented by the node. Graphical features of the node may identify or specify an operational or performance characteristic of the element represented by the node. A size, color or shape of the node may identify an operational state of whether the element is operational or active. A size, color or shape of the node may identify an error condition or issue with an element. A size, color or shape of the node may identify a level of volume of network traffic, a volume of request or responses received, transmitted or traversing the network element represented by the node. A size, color or shape of the node may identify a level of usage of a resource by the element represented by the node, such as memory, bandwidth, CPU or storage. A size, color or shape of the node may identify relativeness with respect to a threshold for any metric associated with the node or the element represented by the node.

The configuration and/or representation of any of the arcs 572 may identify a state, status and/or metric(s) of the element represented by the arc. Graphical features of the arc may identify or specify an operational or performance characteristic of the element represented by the arc. A size, color or shape of the node may identify an operational state of whether the network connection represented by the arc is operational or active. A size, color or shape of the arc may identify an error condition or issue with a connection associated with the arc. A size, color or shape of the arc may identify an error condition or issue with network traffic associated with the arc. A size, color or shape of the arc may identify a level of volume of network traffic, a volume of request or responses received, transmitted or traversing the network connection or link represented by the arc. A size, color or shape of the arc may identify a level of usage of a resource by network connection or traffic represented by the arc, such as bandwidth. A size, color or shape of the node may identify relativeness with respect to a threshold for any metric associated with the arc. In some implementations, a metric for the arc may include any measurement of traffic volume per arc, latency per arc or error rate per arc.

Referring now to FIG. 5C, an implementation of a method for generating and displaying a service graph will be described. In brief overview of method 580, at step 582, a topology is identified, such as for a configuration of one or more services. At step 584, the metrics of elements of the topology, such as for a service are monitored. At step 586, a service graph is generated and configured. At step 588, a service graph is displayed. At step 590, issues with configuration, operation and performance of a service or the topology may be identified or determined.

At step 582, a device identifies a topology for one or more services. The device may obtain, access or receive the topology 510 from storage, such as a database. The device may be configured with a topology for a service, such as by a user. The device may discover the topology or portions therefore via one more discovery protocols communicated over the network. The device may obtain or receive the topology or portions thereof from one or more other devices via the network. The device may identify the network elements making up one or more services. The device may identify functions providing the one or more services. The device may identify other devices or network elements providing the functions. The device may identify the network elements for north-west traffic. The device may identify the network elements for east-west traffic. The device may identify the microservices providing a service. In some implementations, the service graph generator establishes or generates a service graph based on the topology. The service graph may be stored to memory or storage.

At step 584, the metrics of elements of the topology, such as for a service are monitored. The device may receive metrics about the one or more network elements of the topology from other devices. The device may determine metrics from network traffic traversing the device. The device may receive metrics from network elements of the topology, such as via reports or events. The device may monitor the service to obtain or receive metrics about the service. The metrics may be stored in memory or storage, such as in association with a corresponding service graph. The device may associate one or more of the metrics with a corresponding node of a service graph. The device may associate one or more of the metrics with a corresponding arc of a service graph. The device may monitor and/or obtain and/or receive metrics on a scheduled or predetermined frequency. The device may monitor and/or obtain and/or receive metrics on a continuous basis, such as in real-time or dynamically when metrics change.

At step 586, a service graph is generated and configured. A service graph generator may generate a service graph based at least on the topology. A service graph generator may generate a service graph based at least on a service. A service graph generator may generate a service graph based on multiple services. A service graph generator may generate a service graph based at least on the microservices making up a service. A service graph generator may generate a service graph based on a data center, servers of the data center and/or services of the data center. A service graph generator may generate a service graph based at least on east-west traffic and corresponding network elements. A service graph generator may generate a service graph based at least on north-south traffic and corresponding network elements. A service graph generator may configure the service graph with parameters, configuration data or metadata about the elements represented by a node or arc of the service graph. The service graph may be generated automatically by the device. The service graph may be generated responsive to a request by a user, such as via a comment to or user interface of the device.

At step 588, a service graph is displayed. The device, such as via service graph generator, may create a service graph display 514 to be displayed or rendered via a display device, such as presented on a user interface. The service graph display may include visual indicators or graphical characteristics (e.g., size, shape or color) of the nodes and arcs of the service graph to identify status, state or condition of elements associated with or corresponding to a node or arc. The service graph display may be displayed or presented via a dashboard or other user interface in which a user may monitor the status of the service and topology. The service graph display may be updated to show changes in metrics or the status, state and/or condition of the service, the topology or any elements thereof. Via the service graph display, a user may interface or interact with the service graph to discover information, data and details about any of the network elements, such as the metrics of a microservice of a service.

At step 590, issues with configuration, operation and performance of a service or the topology may be identified or determined. The device may determine issues with the configuration, operation or performance of a service by comparing metrics of the service to thresholds. The device may determine issues with the configuration, operation or performance of a service by comparing metrics of the service to previous or historical values. The device may determine issues with the configuration, operation or performance of a service by identifying a change in a metric. The device may determine issues with the configuration, operation or performance of a service by identifying a change in a status, state or condition of a node or arc or elements represented by the node or arc. The device may change the configuration and/or parameters of the service graph. The device may change the configuration of the service. The device may change the configuration of the topology. The device may change the configuration of network elements making up the topology or the service. A user may determine issues with the configuration, operation or performance of a service by reviewing, exploring or interacting with the service graph display and any metrics. The user may change the configuration and/or parameters of the service graph. The user may change the configuration of the service. The user may change the configuration of the topology. The device may change the configuration of network elements making up the topology or the service.

F. System and Methods for Managing Client Requests to Access Services Provided by a Data Center Computer applications can be provided to a client computing device by a remote server. For example, a data center can include one or more servers, each of which may host one or more services that together can form a software applications. Each service can include one or more microservices, which may include software components such as scripts or other executable code configured to perform at least a portion of the functionality associated with their respective services. A client computing device can access a remotely hosted software application by making a series of requests to the remote servers that provide the application. The servers can use the services and microservices of the application to generate responses to the requests of the client computing device, and can transmit the responses to the client computing device.

In some embodiments, requests and responses may be transmitted between the client computing device and the remote servers via a complex computer network, such as the Internet. For example, the requests and responses may pass through computing devices such as gateways, routers, switches, etc., which may be associated with internet service providers, geographically dispersed data centers, and other entities. Due to the complex topology of such a network, it can be technically challenging to determine the cause or location of issues such as problems with delay, latency, bandwidth, response time, application errors, or other problems that can degrade the performance of a remotely provided application. As a result, it can also be technically challenging to overcome such issues, for example by selecting an alternate route through the network or an alternate destination (e.g., a different data center providing the same or similar application) in a manner that can mitigate such issues.

This disclosure provides techniques for identifying the cause and location of such issues. For example, one or more computing devices can identify or determine metrics relating to network traffic (e.g., requests and responses) traversing various portions of a complex computer networking topology. In some embodiments, metrics can be identified for portions of the topology relating to internet service providers, data centers, services and microservices, and links such as wide area network (WAN) links or software-defined WAN (SD-WAN) links. Based on these metrics, problematic areas, devices, or network links can be identified. In some embodiments, alternate network paths or destinations can be selected to avoid areas, devices, or network links that have been identified as potentially problematic. In some embodiments, a visual representation of the network topology and the metrics can be generated and displayed, for example in the form of a service graph, in order to help identify issues that may degrade network performance.

Figure 6A:
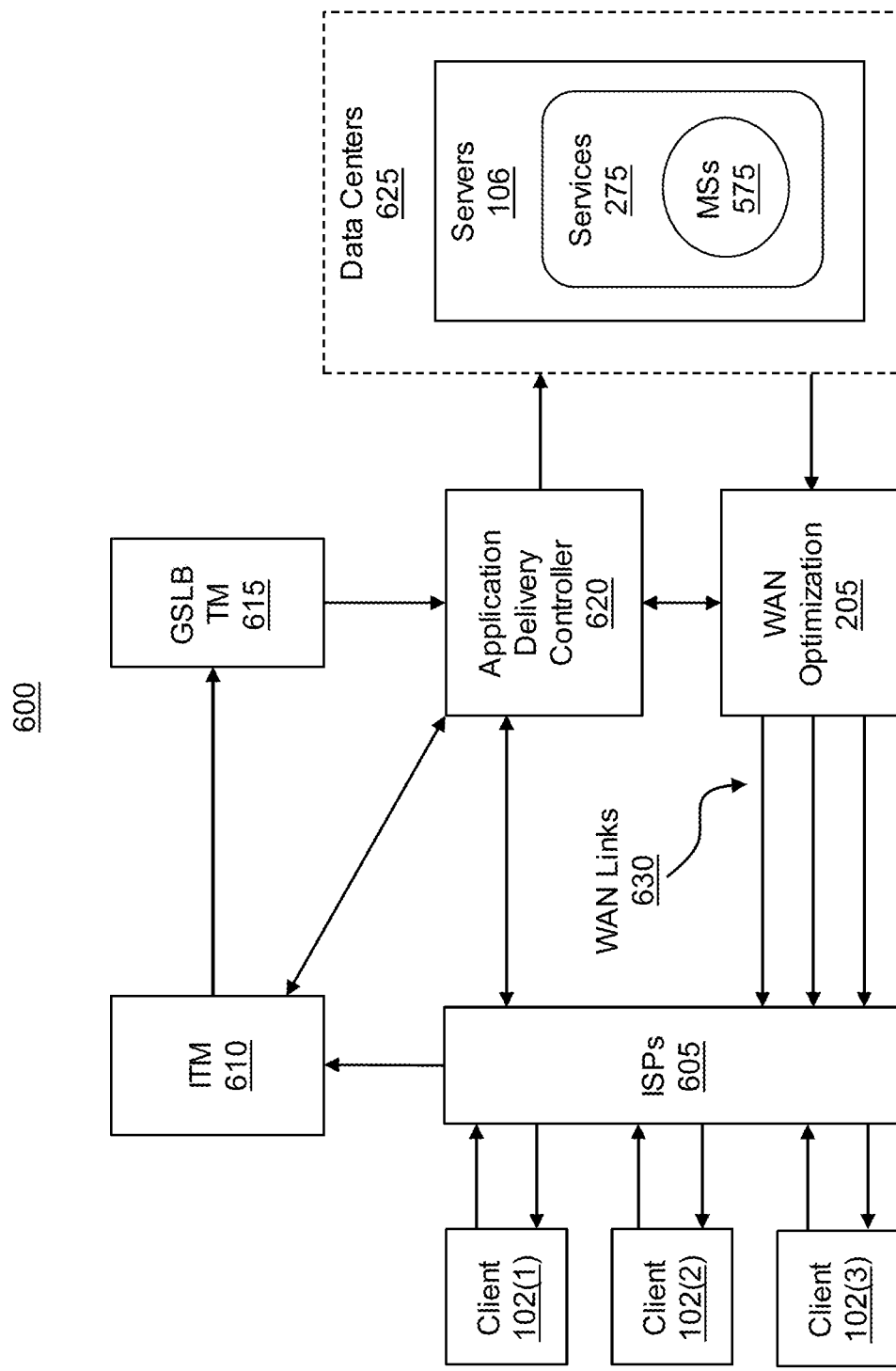
FIG. 6A is a block diagram of a system for managing client requests to access services provided by a data center, in accordance with an illustrative embodiment.

FIG. 6A is a block diagram of a system 600 for managing client requests to access services provided by a data center, in accordance with an illustrative embodiment. The system 600 includes a plurality of client computing devices 102(1)-102(3) (generally referred to as client computing devices 102). The client computing devices 102 can be configured to interact with software applications or other computer information provided by one or more remote data centers 625. For example, a client computing device 102 can transmit a series of requests to one or more servers 106 in the data centers 625 that host services 275 to provide functionality associated with a software application. In some embodiments, at least some of the services 275 may include one or more microservices 575. Generally, a service 275 may include or may interact with any number of microservices 575, and the microservices 575 may each be associated with any number of the services 275. The services 275 and microservices 575 can be software components such as computer scripts that process information received in a request from a client computing device 102 to generate a corresponding response. The requests from the client computing devices 102 and corresponding responses from the servers 106 can be communicated between the client computing devices 102 and the data centers 625 via complex network topology, such as the topology depicted in FIG. 6A.

The network elements coupling the client computing devices 102 with data centers 625 can be or can include the Internet or other computer networks. In some embodiments, the client computing devices 102 may access the network (e.g., the Internet) via one or more internet service providers 605. It should be understood that, while FIG. 6A depicts only a single internet service provider 605, in some embodiments there may be any number of internet service providers 605 that provide internet access (or other computer network access) to the client computing devices 102. An intelligent traffic manager (ITM) 610 can receive a client request via the internet service providers 605 and can pass the request to a global server load balancing (GSLB) ITM 615. The GSLB ITM 615 can pass the request to an application delivery controller 620, which can transmit the request to one or more of the data centers 625.

The services 275 and microservices 575 executed by the one or more servers 106 in the data centers 625 can process information included in a client request to generate a corresponding response. The servers 106 can then provide the response back to the client computing device 102 that generated the request to trigger the response. In some embodiments, the servers 106 can transmit responses to the client computing devices 102 via a WAN optimization appliance 205. The WAN optimization appliance 205 can be configured to select one of a plurality of WAN links 630 for communicating a response received from a server 106 back to an internet service provider 605. The internet service provider 605 can in turn transmit the response back to the client computing device 102 that generated the corresponding request. In some embodiments, this process can be repeated any number of times to allow a client computing device 102 to transmit requests and receive corresponding responses, thereby implementing the functionality of a software application corresponding to the services 275 that execute on the servers 106 in the remote data centers 625.

In some embodiments, the internet service providers 605 can include any infrastructure configured to provide network service, including Internet access, to the client computing devices 102. For example, the internet service providers 605 can include network devices such as routers, switches, proxies, and gateways, as well as physical connections such as copper wire or fiber optic cable, which can be used to communicatively couple the client computing devices 102 with other elements of the system 600, such as the ITM 610.

The ITM 610 can be or can include one or more computing devices configured to select at least a portion of a route through the system 600 via which network traffic, such as client requests generated by the client computing devices 102, can be routed to the data centers 625. For example, while the complexity of the system 600 is simplified for illustrative purposes in FIG. 6A, it should be understood that there may be many different potential paths that network traffic can traverse between the client computing devices 102 and the data centers 625. The ITM 610 can be configured to select at least a portion of at least one path for each network packet or stream of packets received from a client computing device 102. In some embodiments, the ITM 610 can implement one or more algorithms to optimize or improve an aspect of network traffic within the system 600, such as bandwidth, round trip time, latency, etc. In some embodiments, the ITM 610 can be configured to select one of the data centers 625 to which to route a data packet of a client request. In some embodiments, the ITM 610 may select the GSLB ITM 615 that should determine the data center 625 to which a data of a request should be routed. For example, in embodiments in which the system 600 may include more than one GSLB ITM 615, the ITM 610 may select one of the GSLB ITMs 615, and the selected GSLB ITM 615 can determine a data center 625 to which a data packet of a request should be routed.

In some embodiments, the GSLB ITM 615 can also be configured to select at least a portion of at least one route through the system 600 via which network traffic, such as client requests generated by the client computing devices 102, can be routed to the data centers 625. For example, in some embodiments the GSLB ITM 615 can implement a load balancing algorithm or other algorithm to select at least one endpoint (e.g., a particular data center 625, or a particular server 106 within a data center 625) to receive a request from a client computing device 102. In some embodiments, there may be more than one server 106 in a data center 625 that is capable of fulfilling a client request, and there may also be more than one data center 625 having at least one server 106 capable of fulfilling a client request. The GSLB ITM 615 can be configured to implement server load balancing to prevent one data center 625 or server 106 from being overloaded or unduly burdened with network traffic that could instead be routed to an alternative data center 625 or server 106.

In some embodiments, the WAN optimization appliance 205 can accelerate, cache, compress or otherwise optimize or improve performance, operation, flow control, or quality of service of network traffic between the data centers 625 and the client computing devices 102. For example, the WAN optimization appliance 205 may be configured to improve Wide Area File Services (WAFS). In some embodiments, the WAN optimization appliance 205 can improve network traffic flow by selecting, for at least one packet of a response generated by a server 106, one of the WAN links 630 to use for delivering the packet to a client computing device 102. Thus, the WAN optimization appliance 205 can help to reduce congestion across the WAN links 630 and to avoid use of one or more of the WAN links 630 that may be experiencing an outage or other network issue. In some embodiments, the WAN optimization appliance 205 may be a performance enhancing proxy or a WAN optimization controller. In some embodiments, appliance 205 may be implemented as Citrix SD-WAN products sold by Citrix Systems, Inc. of Fort Lauderdale, Fla.

In some embodiments, the application delivery controller 620 can accelerate delivery of at least a portion of a software application, computing environment, or other network resource to a client 102. For example, application delivery controller 620 may accelerate delivery of a streaming application and data file processable by the application from a data center 625 to a remote user location by accelerating transport layer traffic between a client 102 and a server 106. Such acceleration may be provided by techniques such as transport layer connection pooling, transport layer connection multiplexing, transport control protocol buffering, compression, caching, or other techniques. The application delivery controller 620 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations. In some embodiments, the application delivery controller 620 can be implemented as a network device such as Citrix networking (formerly NetScaler®) products sold by Citrix Systems, Inc. of Fort Lauderdale, Fla.

In some embodiments, the application delivery controller 620, together with the internet service providers 605, the ITM 610, the GSLB ITM 615, the data centers 625, and the WAN optimization appliance 205, can be configured to manage network traffic in the system 600 in a manner the can improve efficiency of delivery of applications (e.g., applications corresponding to the services 275 and microservices 575 provided by the servers 106) to the client computing devices 102. An example method for managing traffic in the system 600 is described further below in connection with FIG. 6B.

Figure 6B:
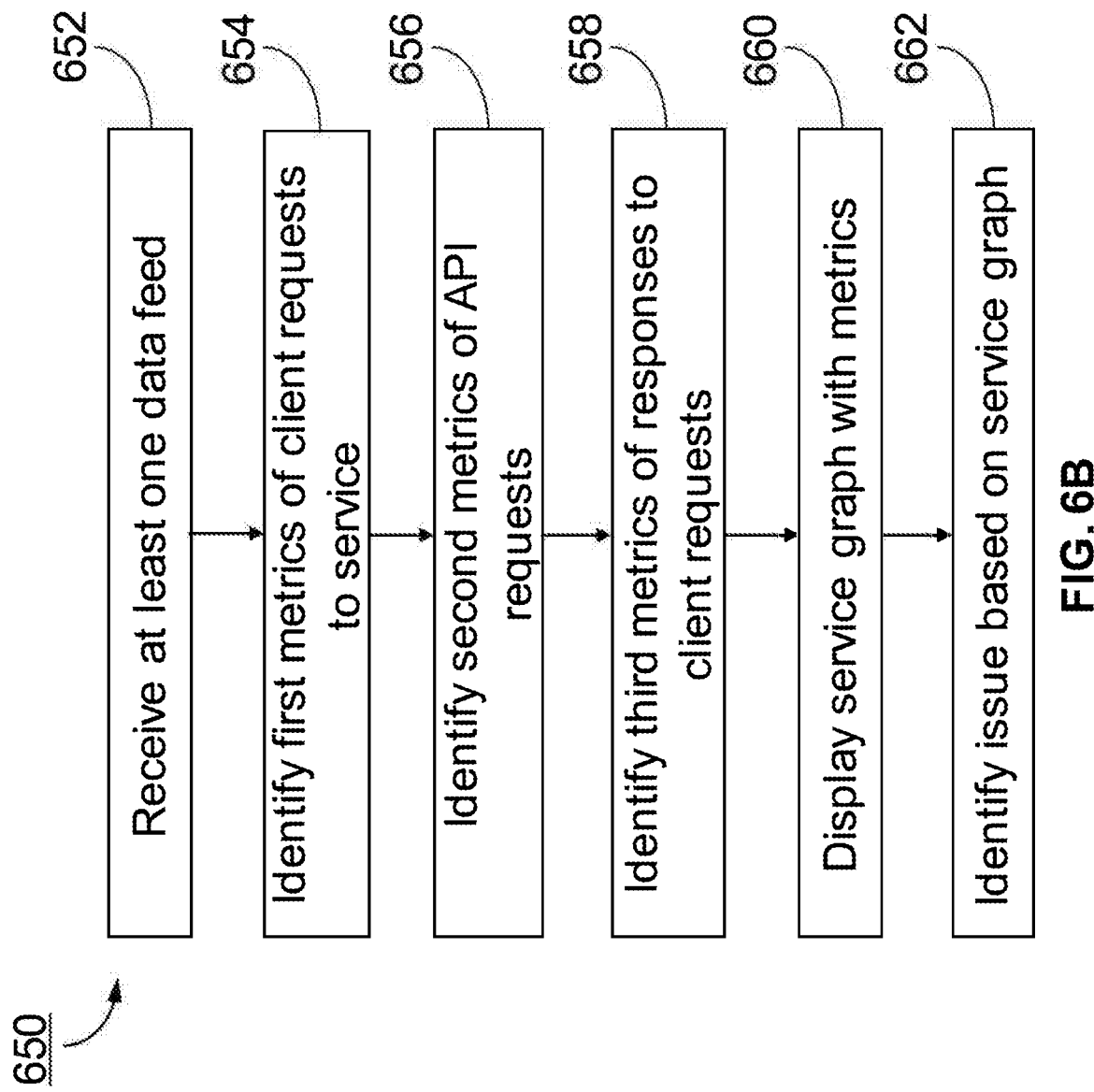
FIG. 6B is a flow diagram of a method for managing client requests to access services provided by a data center, according to an illustrative embodiment.

Referring now to FIG. 6B, depicted is a method 650 for managing client requests to access services provided by a data center, according to an illustrative embodiment. In brief overview of the method 650, at step 652, at least one data feed can be received. First metrics of client requests to a service can be identified at step 654, second metrics of application programming interface (API) requests can be identified at step 656, and third metrics of responses to client requests can be identified at step 658. At step 660, a service graph can be displayed and at step 680, an issue can be identified based on the service graph. In some embodiments, the method 650 can be performed by one or more components of the system 600 shown in FIG. 6A. For example, the steps of the method 650 can be performed by the application delivery controller 620. The system 600 is therefore referred to below in connection with the description of the method 650.

Referring again to FIG. 6B, and in greater detail, the method 650 can include receiving at least one data feed (step 652). In some embodiments, the data feed can be received by the application delivery controller 620. The data feed can be or can include any information relating to network performance or network conditions in at least a portion of the system 650, including performance or conditions of any of the computing devices or software components of the system 600. For example, the application delivery controller 620 can receive a data feed from one or more of the internet service providers 605, the ITM 610, the GSLB ITM 615, the data centers 625, and the WAN optimization appliance 205. A data feed may include a stream of information transmitted in the form of one or more reports or events that can be received by the application delivery controller 620. In some embodiments, the application delivery controller 620 itself may generate a data feed.

The method 650 can include identifying first metrics of client requests to a service (step 654). For example, the requests can be requests sent from any of the client computing devices 102 to any of the internet service providers 605. In some embodiments, the requests can be requests from the client computing devices 102 to access one or more applications provided by the hardware and software components within one or more of the data centers 625, such as the servers 106, the services 275, and the microservices 575. The first metrics can include any information relating to one or more network connections or network devices involved in the transmission or receipt of the requests between the client computing devices 102 and the internet service providers 605.

For example, the first metrics can include information relating to network latency, bandwidth utilization, bandwidth availability, or network congestion for the network infrastructure linking the client computing devices 102 with the internet service providers 605 in the system 600. Such metrics can be indicative of the network conditions in the portion of the system 600 between the client computing devices 102 and the internet service providers 605. In some implementations, the application delivery controller 620 can measure these metrics, for example via a remote probing or sensing device positioned in the network path between the client computing devices 102 and the internet service providers 605.

In some other implementations, the application delivery controller 620 can determine these metrics based on information received from other devices, such as the client computing devices 102 and the internet service providers 605. For example, the client computing devices 102 or the internet service providers 605 can measure or determine network metrics for the portion of the network linking the client computing devices 102 and the internet service providers 605, and can relay these metrics to the application delivery controller 620. In some implementations, this information can be relayed to the application delivery controller 620 as at least a portion of the data feed received in step 652 of the method 650.

In some implementations, in order to accurately measure the network conditions, the application delivery controller 620 can identify metrics from multiple computing devices (e.g., multiple client computing devices 102 or multiple internet service providers 605) as well as multiple links joining the devices. In some implementations, the application delivery controller 620 can further process metrics received from multiple sources, for example by aggregating the metrics, determining an average value for one or more metrics, determining a median value for one or more metrics, etc.

In some implementations, the first metrics can also include metrics relating to the client computing devices 102 and the internet service providers 605, rather than the network links joining these devices. For example, the first metrics can include response times, cache usage, memory usage, processor usage, storage usage, database transactions, active users (e.g., a number of client computing devices 102 actively communicating with at least one internet service provider 605 during a time interval), and/or other performance conditions and metrics relating to at least one client computing device 102 or at least one internet service provider 605. In some implementations, the client computing devices 102 and the internet service providers 605 may report such metrics to the application delivery controller 620.

In some implementations, the application delivery controller 620 may identify the first metrics on a per-client basis. For example, the application delivery controller 620 may identify the set of first metrics to include metrics that relate to a particular one of the client computing devices 102, and may ignore or discard metrics for other client computing devices 102. Similarly, in some implementations, the application delivery controller 620 may identify the first metrics on a per-ISP basis. For example, the application delivery controller 620 may identify the set of first metrics to include metrics that relate to a particular one of the internet service providers 605, and may ignore or discard metrics for other internet service providers 605. In still other implementations, the application delivery controller 620 may identify the first metrics on a per-application basis. For example, the application delivery controller 620 may identify the set of first metrics to include metrics relating to requests from all client computing devices 102 for a particular application provided by the data centers 625. Thus, in some implementations, the application delivery controller 620 can receive or determine metrics for a plurality of the client computing devices 102 and can aggregate these metrics to determine the set of first metrics.

The method 650 can include identifying second metrics of API requests (step 656). In some embodiments, the API requests can correspond to communications between the microservices 575 of one or more services 275 in one or more servers 106 of one or more data centers 625. For example, a microservice 575 can generate an API request in response to its corresponding server 106 receiving a request from a client computing device 102. The client request can include parameters or other data that can be processed by one or microservices 575 to perform a function associated with the application requested by the client computing device 102. In some embodiments, a first microservice 575 may generate an API request that can be fulfilled by a second microservice 575. The application delivery controller 620 can be configured to identify metrics relating to these API requests. For example, the second metrics can include any information relating to one or more network connections or network devices involved in the API requests (e.g., one or more servers 106 or one or more communications lines linking the servers 106), including information relating to network latency, bandwidth utilization, bandwidth availability, network congestion, response times of one or more servers 106, application usage and performance (e.g., any information relating to an application corresponding to the services 275 and microservices 575), session connections to an application, cache usage of one or more servers 106, memory usage of one or more servers 106, processor usage of one or more servers 106, storage usage of one or more servers 106, database transactions of one or more servers 106, active users (e.g., client computing devices 102 attempting to access an application), duration of user activity, application crashes, errors, time required to log-in to an application, and/or other performance conditions and metrics.

In some implementations, the application delivery controller 620 can identify or determine the second metrics based on information received from other devices, such as the servers 106. For example, the servers 106 can measure or determine network metrics for communication links between the servers 106, and can relay these metrics to the application delivery controller 620. In some implementations, this information can be relayed to the application delivery controller 620 as at least a portion of the data feed received in step 652 of the method 650.

In some implementations, in order to accurately measure the network conditions, the application delivery controller 620 can identify metrics from multiple servers 106. In some implementations, the application delivery controller 620 can further process metrics received from multiple sources, for example by aggregating the metrics, determining an average value for one or more metrics, determining a median value for one or more metrics, etc.

In some implementations, the application delivery controller 620 may identify the second metrics on a per-client basis. For example, the application delivery controller 620 may identify the set of second metrics to include metrics that relate to a particular one of the client computing devices client computing device 102 (e.g., response times of services 275 and microservices 575 used to fulfill a request from a particular client computing device 102), and may ignore or discard metrics for other client computing devices 102. Similarly, in some implementations, the application delivery controller 620 may identify the second metrics on a per-server basis. For example, the application delivery controller 620 may identify the set of second metrics to include metrics that relate to a particular one of the servers 106, and may ignore or discard metrics for other servers 106. In still other implementations, the application delivery controller 620 may identify the second metrics on a per-application basis. For example, the application delivery controller 620 may identify the set of second metrics to include metrics relating to the API requests between services 275 and microservices 575 for a particular application, and may ignore or discard metrics relating to API requests for other applications.

The method 650 can include identifying third metrics of responses to client requests (step 658). For example, the responses can include any network traffic sent from the WAN optimization appliance 205 to the client computing devices 102. Such network traffic can correspond to the responses to the client requests that were generated by the services 275 and microservices 575 executing on the one or more servers 106 in one or more data center 625. For example, metrics may include information relating to one or more network connections (e.g., one or more of the WAN links 630) or network devices (e.g., the WAN optimization appliance 205), such as network latency, bandwidth utilization, bandwidth availability, network congestion, response times of the WAN optimization appliance 205, cache usage of the WAN optimization appliance 205, memory usage of the WAN optimization appliance 205, processor usage of the WAN optimization appliance 205, storage usage of the WAN optimization appliance 205, database transactions of the WAN optimization appliance 205, and/or other performance conditions and metrics.

In some implementations, the application delivery controller 620 can identify or determine the third metrics based on information received from one or more other devices, such as the WAN optimization appliance 205. For example, the WAN optimization appliance 205 can measure or determine network metrics for the WAN links 630, and can relay these metrics to the application delivery controller 620. In some implementations, this information can be relayed to the application delivery controller 620 as at least a portion of the data feed received in step 652 of the method 650.

In some implementations, in order to accurately measure the network conditions, the application delivery controller 620 can identify metrics from multiple sources or relating to multiple entities, such as multiple WAN links 630. In some implementations, the application delivery controller 620 can further process metrics received from multiple sources or for multiple entities, for example by aggregating the metrics, determining an average value for one or more metrics, determining a median value for one or more metrics, etc.

In some implementations, the application delivery controller 620 may identify the second metrics on a per-client basis. For example, the application delivery controller 620 may identify the set of third metrics to include metrics that relate to a particular one of the client computing devices client computing device 102 (e.g., response times the WAN optimization appliance 205 for sending responses to a client computing device 102), and may ignore or discard metrics relating to other client computing devices 102. Similarly, in some implementations, the application delivery controller 620 may identify the third metrics on a per-WAN link basis. For example, the application delivery controller 620 may identify the set of third metrics to include metrics that relate to a particular one of the WAN links 630, and may ignore or discard metrics for other WAN links 630. In still other implementations, the application delivery controller 620 may identify the third metrics on a per-application basis. For example, the application delivery controller 620 may identify the set of third metrics to include metrics relating to responses for a particular application, and may ignore or discard metrics relating to other applications.

In some embodiments, the application delivery controller 620 can be configured to access, collect, determine, or otherwise identify one or more of the first metrics, the second metrics, or the third metrics based on the data feed received in step 652. In some embodiments, the application delivery controller 620 itself may monitor or generate the metrics. The application delivery controller 620 can store the metrics in memory or storage.

The method 650 can include displaying a service graph including metrics (step 660). For example, the metrics included in the service graph can include any of the first metrics, the second metrics or the third metrics identified in steps 654, 656, and 658. In some embodiments, the application delivery controller 620 can use the metrics to generate the service graph. The service graph may include data representing the topology of at least a portion of the system 600 used to allow a client computing device 102 to access a service 275, such any elements making up the service 275 (e.g., one or more servers 106) or any elements used by the service 275 (e.g., any of the computing devices of the system 600 that serve as pathways for requests to the service 275 or responses from the service 275).

In some embodiments, the service graph can be similar to the service graph 505 shown in FIG. 5B. For example, the application delivery controller 620 can generate the service graph in a node-based form, such as a graphical arrangement of nodes with each node representing an element or function of the topology of a portion of the system 600 used by a service 275. The service graph may represent the topology of a portion of the system 600 using nodes connected among each other via various connectors or links, which may be referred to as arcs. An arc may identify a relationship between elements connected by the arc in the service graph. Nodes and arcs may be arranged in a manner to identify or describe one or more services. Nodes and arcs may be arranged in a manner to identify or describe functions provided by the one or more services 275. For example, a function node may represent a function that is applied to the traffic, such as a transform (SSL termination, VPN gateway), filter (firewalls), or terminal (intrusion detection systems). A function within the service graph may use one or more parameters and have one or more connectors. In some embodiments, the application delivery controller 620 can associate one or more of the first metrics, the second metrics, or the third metrics with a corresponding node or arc of the service graph.

The application delivery controller 620 may render the service graph display in visual form to have any type of color, shape, size, or other graphical indicators of the nodes and arcs of the service graph to represent a state or status of the respective elements. The service graph display may also be rendered in visual form to have any type of color, shape, size or other graphical indicators of the nodes and arcs of the service graph to represent a state or status of one or more of the first metrics, the second metrics, or the third metrics. In some embodiments, the application delivery controller 620 can display the service graph via an electronic display of the application delivery controller 620. In some other embodiments, the application delivery controller 620 may transmit information corresponding to the service graph to another computing device (e.g., a client computing device 102) to cause the other computing device to display the service graph. The service graph display may include any type of user interface, such as a dashboard, that provides the visual form of the service graph for display to a viewer. The service graph display may include any type and form of user interface elements to allow users to interact, interface or manipulate a service graph. For example, one or more portions of the service graph display may be selectable to identify information, such as metrics or topology information about that portion of the service graph. In some embodiments, one or more portions of the service graph display may be or may include user interface elements for users to take an action with respect to the service graph or portion thereof, such as to modify a configuration or parameter of the element.

The method 650 can include identifying an issue based on the service graph (step 662). For example, the application delivery controller 620 can use the first metrics, the second metrics, or the third metrics represented by the service graph, as well as any nodes or arcs of the service graph, to identify one or more issues with elements of the system 600 (e.g., networking devices or physical connections between the devices). For example, the application delivery controller 620 can compare information of the service graph (e.g., one or more of the metrics) to one or more corresponding threshold values to determine whether certain elements are functioning as expected. The application delivery controller 620 may determine issues with the configuration, operation, or performance of a service 275 by comparing metrics of the service 275 to previous or historical values, or identifying a change in a metric, identifying a change in a status, state, or condition of a node or arc in the service graph. In some embodiments, the application delivery controller 620 may also change a configuration or one or more parameters of one or more elements represented by the service graph to address the identified issue.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

I claim:
1. A method comprising:
(a) identifying, by a first device, first metrics for a service, the first metrics generated from client requests to the service communicated from a plurality of clients via one or more Internet service providers (ISPs) to a data center comprising a plurality of servers providing the service, the first metrics used to identify issues with the one or more ISPs;
(b) identifying, by the first device, second metrics for the service, the second metrics generated from application programming interface (API) requests communicated between a plurality of microservices of the service responsive to the client requests being forwarded to the plurality of servers, the second metrics used to identify issues with the plurality of microservices;
(c) identifying, by the first device, third metrics for the service, the third metrics generated from responses to the client requests, the responses generated by the plurality of microservices and communicated between a second device and the plurality of clients via one or more wide area network (WAN) links, the second device intermediary between the plurality of servers and the plurality of clients and configured to select the one or more WAN links via which to communicate the responses to the client requests, the third metrics used to identify issues with the one or more WAN links;
(d) generating, by the first device, a service graph to identify issues with at least one of the one or more ISPs, the plurality of microservices, or the one or more WAN links, the issues identified using the first, second, and third metrics; and
(e) displaying, by the first device, on the service graph, one or more graphical indicators, the one or more graphical indicators generated using the first metrics, the second metrics, or the third metrics, and used to identify an issue with at least one of the one or more ISPs, the plurality of microservices, or the one or more WAN links.

2. The method of claim 1, wherein the client requests are forwarded to the data center by a traffic manager configured to select one of a global traffic manager or the data center based on at least fourth metrics of the one or more ISPs.

3. The method of claim 1, wherein the first device is intermediary to the one or more ISPs and the data center.

4. The method of claim 1, wherein d further comprises generating, by the first device, the service graph comprising a plurality of nodes to represent at least each of the one or more ISPs, the second device, and the plurality of microservices of the service.

5. The method of claim 4, further comprising generating, by the first device, the service graph to comprise arcs between each of the plurality of nodes to identify metrics of network traffic between each of the plurality of nodes.

6. The method of claim 1, wherein the client requests are forwarded from the plurality of clients via the one or more ISPs to an application delivery controller configured to manage network traffic to the service.

7. The method of claim 6, further comprising identifying, by the first device, from the application delivery controller, metrics of network traffic of the plurality of clients between the one or more ISPs and the service, and generating, by the first device, the service graph, to identify, via the metrics of network traffic, one or more issues between the one or more ISPs and the service.

8. The method of claim 1, wherein (e) further comprises displaying, by the first device, the service graph generated to identify metrics of network traffic from the plurality of clients via the one or more ISPs through the data center and to the plurality of clients via the second device.

9. The method of claim 1, wherein (e) further comprises identifying, by the first device, the issue via the service graph.

10. A system comprising:
a first device comprising one or more processors, coupled to memory and configured to:
identify first metrics for a service, the first metrics generated from client requests communicated between a client of a plurality of clients via an Internet service provider (ISP) to a data center comprising a plurality of servers providing the service, wherein the client requests are to access the service, and wherein the first metrics are used to identify issues with the one or more ISPs; and
wherein the first device is configured to:
identify second metrics for the service, the second metrics generated from application programming interface (API) requests communicated between a plurality of microservices of the service responsive to the client requests being forwarded to the plurality of servers, the second metrics used to identify issues with the plurality of microservices;
identify third metrics for the service, the third metrics generated from responses to the client requests, the responses generated by the plurality of services, communicated between a second device and the client via one or more wide area network (WAN) links, the second device intermediary between the plurality of servers and the plurality of clients and configured to select the one or more WAN links via which to communicate the responses to the client requests, the third metrics used to identify issues with the one or more WAN links;
generate a service graph to identify issues with at least one of the one or more ISPs, the plurality of microservices, or the one or more WAN links, the issues identified using the first, second, and third metrics; and
display on the service graph, one or more graphical indicators, the one or more graphical indicators generated using the first metrics, the second metrics, or the third metrics, and used to identify an issue with at least one of the one or more ISPs, the plurality of microservices, or the one or more WAN links.

11. The system of claim 10, wherein the client requests are forwarded to the data center by a traffic manager configured to select one of a global traffic manager or the data center based on a least fourth metrics of the one or more ISPs.

12. The system of claim 10, wherein the first device is intermediary to the one or more ISPs and the data center.

13. The system of claim 10, wherein the first device is further configured to generate the service graph comprising a plurality of nodes to represent at least each of the one or more ISPs, the second device, and the plurality of microservices of the service.

14. The system of claim 13, wherein the first device is further configured to generate the service graph to comprise arcs between each of the plurality of nodes to identify metrics on network traffic between each of the plurality of nodes.

15. The system of claim 10, wherein the client requests are forwarded from the plurality of clients via the one or more ISPs to an application delivery controller configured to manage network traffic to the service.

16. The system of claim 15, wherein the first device is further configured to identify, from the application delivery controller, metrics of network traffic of the plurality of clients between the one or more ISPs and the service, and to generate the service graph to identify, via the metrics of network traffic, one or more issues between the one or more ISPs and the service.

17. The system of claim 10, wherein the first device is further configured to display the service graph generated to identify metrics of network traffic from the plurality of clients via the one or more ISPs through the data center and to the plurality of clients via the second device.

18. The system of claim 10, wherein the first device is further configured to identify the issue via the service graph.

* * * * *